(12) United States Patent
Keller et al.

(10) Patent No.: US 9,714,596 B2
(45) Date of Patent: *Jul. 25, 2017

(54) METHOD OF MANUFACTURING AN EXHAUST GAS CARRYING DEVICE AND TOOL THEREFOR

(71) Applicant: Faurecia Emissions Control Technologies, Germany GmbH, Augsburg (DE)

(72) Inventors: Stefan Keller, Meitingen (DE); Stefan Meischkoetter, Esslingen (DE); Otto Steinhauser, Neusaess (DE); Manfred Stiglmaier, Thierhaupten (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 222 days.

This patent is subject to a terminal disclaimer.

(21) Appl. No.: 14/469,638

(22) Filed: Aug. 27, 2014

(65) Prior Publication Data

US 2014/0360016 A1     Dec. 11, 2014

Related U.S. Application Data

(62) Division of application No. 13/063,020, filed as application No. PCT/EP2009/006581 on Sep. 10, 2009, now Pat. No. 8,857,056.

(30) Foreign Application Priority Data

Sep. 10, 2008   (DE) .................. 10 2008 046 527

(51) Int. Cl.
*F01N 3/28*     (2006.01)
*B21D 17/02*   (2006.01)
(Continued)

(52) U.S. Cl.
CPC .............. *F01N 3/28* (2013.01); *B21D 17/02* (2013.01); *B21D 39/04* (2013.01); *B23P 11/005* (2013.01);
(Continued)

(58) Field of Classification Search
CPC ....... B21D 39/048; B21D 37/00; B21D 53/88; B21D 17/02; B21D 53/02; B21K 25/00;
(Continued)

(56) References Cited

U.S. PATENT DOCUMENTS 5,119,551 A   6/1992  Abbott
5,329,698 A   7/1994  Abbott
(Continued)

FOREIGN PATENT DOCUMENTS

DE          4445557 A1      6/1996
DE      102006049236 A1     4/2008
(Continued)

OTHER PUBLICATIONS

International Search Report, dated Dec. 18, 2009.
English translation of International Preliminary Report on Patentability, dated Mar. 24, 2011.

*Primary Examiner* — Sarang Afzali
(74) *Attorney, Agent, or Firm* — Carlson, Gaskey & Olds, PC

(57) ABSTRACT

A method of manufacturing an exhaust gas carrying device, in particular an exhaust gas purification device, and a tool provided therefor include segment-like jaws that are used to deform a an outer housing. The jaws have indentations or projections adjacent to each other, and which are complementary to form a continuously surrounding indentation/projection. The reshaped outer housing is provided with one or more surrounding projections or indentations by the deformation.

19 Claims, 2 Drawing Sheets

(51) Int. Cl.
*B21D 39/04* (2006.01)
*B23P 11/00* (2006.01)
*F01N 13/14* (2010.01)
*F01N 13/18* (2010.01)
*B23P 17/00* (2006.01)

(52) U.S. Cl.
CPC ............ *B23P 17/00* (2013.01); *F01N 3/2853* (2013.01); *F01N 13/141* (2013.01); *F01N 13/18* (2013.01); *F01N 13/185* (2013.01); *F01N 13/1838* (2013.01); *B23P 2700/03* (2013.01); *F01N 2260/10* (2013.01); *F01N 2260/18* (2013.01); *F01N 2350/00* (2013.01); *F01N 2450/02* (2013.01); *F01N 2450/20* (2013.01); *Y10T 29/49345* (2015.01); *Y10T 29/49398* (2015.01); *Y10T 29/49861* (2015.01); *Y10T 29/49897* (2015.01); *Y10T 29/49913* (2015.01); *Y10T 29/49927* (2015.01); *Y10T 29/53* (2015.01); *Y10T 29/53726* (2015.01); *Y10T 29/53996* (2015.01)

(58) Field of Classification Search
CPC .... B23P 11/005; B23P 2700/03; F01N 13/18; F01N 13/185; F01N 13/1838; F01N 3/2853; F01N 2350/02; F01N 2450/02; F01N 2450/20
See application file for complete search history.

(56) References Cited

U.S. PATENT DOCUMENTS

| | | |
|---|---|---|
| 2003/0167854 A1 | 9/2003 | Irie |
| 2004/0265191 A1 | 12/2004 | Tursky |

FOREIGN PATENT DOCUMENTS

| | | |
|---|---|---|
| EP | 684097 A | 11/1995 |
| GB | 2020190 | 11/1979 |
| JP | 10314870 A | 12/1998 |
| JP | 2002097944 | 4/2002 |
| WO | 2009017235 A | 2/2009 |

METHOD OF MANUFACTURING AN EXHAUST GAS CARRYING DEVICE AND TOOL THEREFOR

RELATED APPLICATION

This application is a continuation of U.S. patent application Ser. No. 13/063,020, filed Mar. 9, 2011, now U.S. Pat. No. 8,857,056, which is the U.S. national phase of International Patent Application PCT/EP2009/006581, filed 10 Sep. 2009, which claims priority to German Application No. 10 2008 046 527.5, filed 10 Sep. 2008.

TECHNICAL FIELD

The present invention relates to a method of manufacturing an exhaust gas carrying device, in particular an exhaust gas purification device, which has an outer housing with an insert clamped therein, as well as an appropriate tool.

BACKGROUND

It is known from the prior art to clamp exhaust gas carrying devices, which more particularly include catalytic converters and diesel particulate filters, in an outer housing. The insert typically consists of a brittle ceramic substrate, also referred to as a monolith, and a flexible, compensating bearing mat.

The prior art according to WO 2008/064860 A1 discloses the provision of point-shaped extensions in the segment-like pressure jaws of a tool to fix neighboring substrates in place, the extensions pressing the outer housing in sections to clamp the substrate. In the closed condition, the inner faces of the pressure jaws have an inner contour that corresponds to the outer contour to be attained of the outer housing.

But in these so-called "shrinking methods," which operate using segment-like pressure jaws that extend around the outer housing and move inwards to deform the outer housing, it is generally a problem that this deformation causes the outer housing to lengthen in the axial direction. This means that there are certain tolerance problems or that an axial mechanical machining operation is required after the shrinking process.

The objective is to provide a method and a tool for carrying out the method, in which the machining process is effected in a simpler and more precise fashion.

SUMMARY

A method of manufacturing an exhaust gas carrying device includes the following steps: providing a tool having segment-like jaws which are adapted to be moved inwards against an outer housing; providing an indentation or a projection on an inside of each jaw, with indentations or projections of all jaws being oriented in relation to each other such that a continuously surrounding indentation or a continuously surrounding projection is obtained; placing the outer housing and an insert positioned therein into the tool; deforming the outer housing by closing the jaws to clamp the insert in the outer housing; and producing a surrounding projection or a surrounding indentation on the outer jacket remote from the ends thereof when closing the jaws.

By producing a continuously surrounding projection or a continuously surrounding indentation, the outer jacket becomes shorter in the axial direction than without the projection or indentation. The "unnecessary" material is, as it were, accommodated in the projection or indentation.

A rolling process or the like is no longer needed, which would constitute a later machining of the outer housing. Instead, the projection or the indentation is produced during the clamping process itself, i.e. during shrinking.

To increase the stability of the outer housing, more particularly a projection is produced. With a view to stability, such projection is even preferred to an indentation. This means that the material will give way and move into the indentations of the jaws during the shrinking process.

In one example, a plurality of projections (or indentations) spaced axially from each other are provided on the outer jacket. Accordingly, this results in a kind of rings which surround the outer jacket to stabilize it and provide for its exact length.

As viewed in cross-section, the projections/recesses more particularly have an arcuate radial end, which is simpler for the plastic deformation.

According to one example embodiment, the outer housing is configured as a circumferentially closed tube into which the insert is inserted. As an alternative, a kind of wrapping of a sheet metal strip would, of course, also be possible, which is placed around the insert and is welded and closed on the edges after the segments are closed.

For an exact adjustment of the axial length, provision is made according to the preferred embodiment that the outer housing is positioned in the tool between two axial stops before the jaws are moved inwards. The stops define the axial length of the outer housing after reshaping since the outer housing rests against the stops after the reshaping process.

The tool according to the invention for manufacturing an exhaust gas carrying device includes appropriately designed jaws having projections and extensions which complement one another on the circumference to form a continuously surrounding indentation or projection.

These and other features of the present invention can be best understood from the following specification and drawings, of which the following is a brief description.

BRIEF DESCRIPTION OF THE DRAWINGS

Further features and advantages of the invention will be apparent from the description below and from the accompanying drawings, to which reference is made. In the drawings.

DETAILED DESCRIPTION

Figure 1:
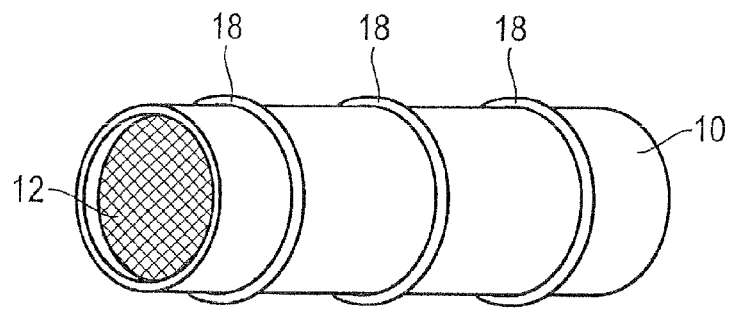
FIG. 1 shows a perspective view of an exhaust gas carrying device manufactured in accordance with the invention, prior to putting on and attaching the funnel-shaped inlets and outlets.

FIG. 1 shows an exhaust gas carrying device manufactured in accordance with the invention, in the form of a catalytic converter or a diesel particulate filter. The exhaust gas carrying device comprises a tubular outer housing 10 and an insert 12 which is clamped in the tube and includes a substrate 14 (see FIG. 3) which comprises ceramics and is preferably catalytically coated, as well as a bearing mat 16 surrounding the substrate 14. The outer housing 10 preferably is, from the start, a closed tube made of metal.

As can be seen in FIG. 1, the outer housing 10 is provided with a plurality of circumferentially continuously surrounding annular projections 18 spaced from its axial ends, which are produced by deformation of the outer housing 10.

Figure 2:
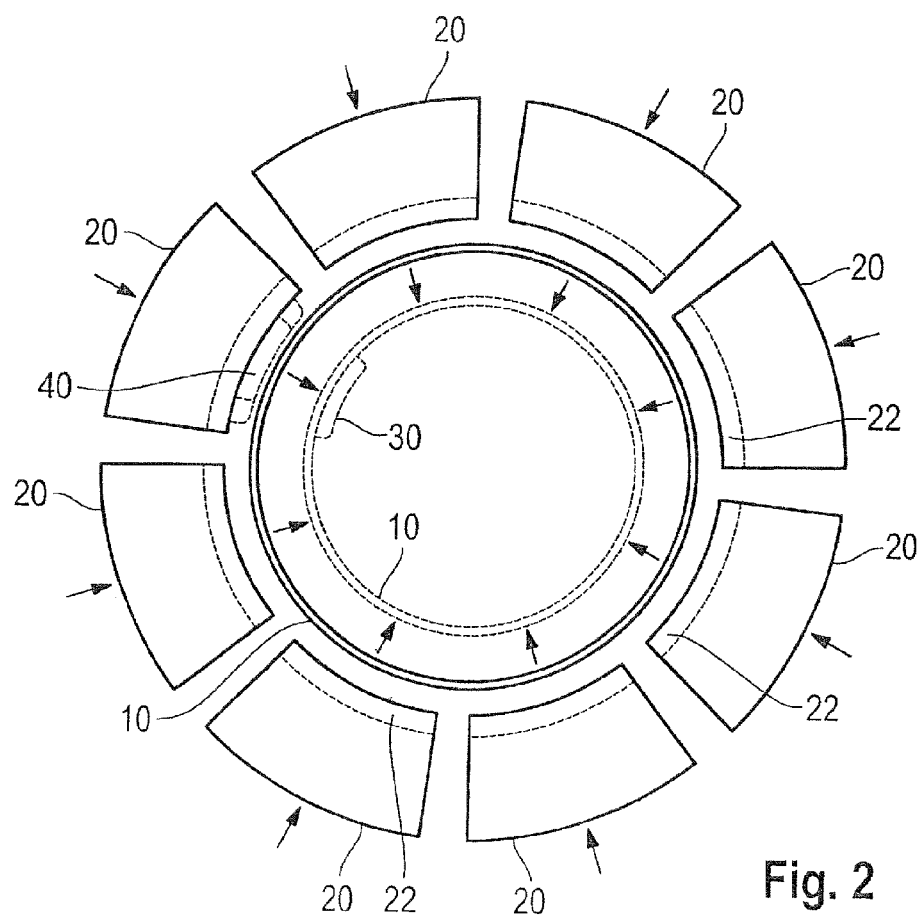
FIG. 2 shows a side view of a tool according to the invention.
Figure 4:
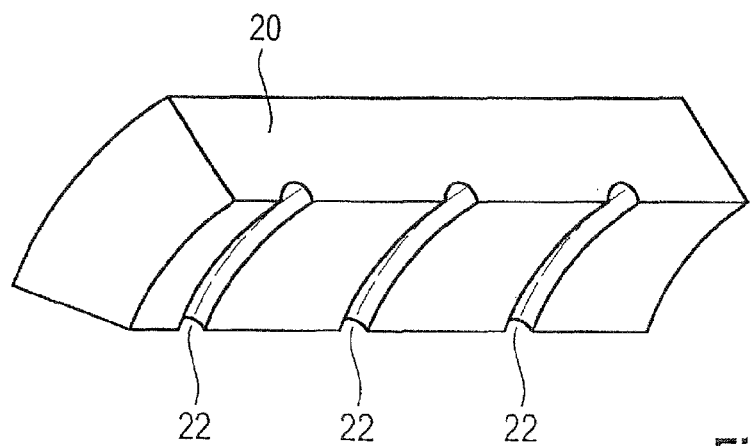
FIG. 4 shows a single jaw utilized in the tool according to the invention.

FIG. 2 illustrates a tool which is used for plastically deforming the outer housing 10 and radially clamping the insert 12 in the outer housing 10. This tool is a so-called "shrinking tool" having a plurality of pressure jaws 20 which are segment-like as seen in a side view and which can be closed inwards in the direction of the arrows. In the closed condition, the inner faces of the pressure jaws have an inner contour that corresponds to the outer contour to be attained of the outer housing 10. One of these jaws 20 is illustrated in FIG. 4. Like the others, this jaw 20 is elongate and extends beyond the outer housing 10 in the axial direction, i.e. it is longer than the outer housing.

Figure 3:
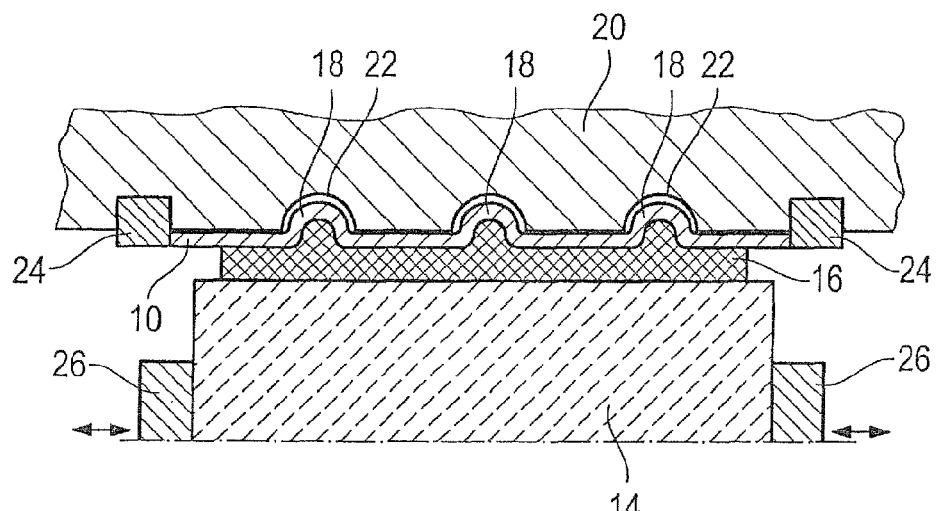
FIG. 3 shows a view of a longitudinal section taken through the tool according to the invention, more precisely through an upper half of the tool.

As can be seen in FIGS. 2 to 4, the jaws 20 have indentations 22 on their inner faces.

These indentations 22 are complementary in the circumferential direction. When the tool is in the closed condition or has been moved inwards, a recess 22 of a jaw 20 continues into the respective recesses 22 of the adjacent jaws 20 in the circumferential direction, so as to form a circumferentially closed, at least largely closed groove.

FIG. 3 shows that the indentations run out in an arc shape at their deepest point, i.e. they have an arcuate radial bottom or an arcuate radial end.

In addition, the tool has axial stops 24 (see FIG. 3), which may be optionally formed in the jaws 20 or are in the form of separate parts possibly adapted to be fed.

The manufacturing method will now be explained in greater detail below.

At first the substrate 14 and the bearing mat 16 are pushed as a unit into the outer housing 10, and this unit is subsequently introduced into the open tool. A correct orientation of the insert 12 in relation to the outer housing 10 must be provided in the axial direction.

The unit is then positioned between the stops 24; preferably, the axial ends of the outer housing 10 even rest against the stops 24. But it may also be expedient in this connection to provide a small gap axially in advance so that, irrespective of the axial length tolerances of the outer housings 10 installed, as related to the initial condition, the same axial length will always be obtained after manufacture.

It is also possible to additionally fix the substrate 14 in its position by using stops 26. These stops 26 can be moved uniformly to the substrate 14 to align the substrate 14 axially in relation to the tool. This uniform movement may be attained, for example, by coupling the stops 26 to a shared spindle or a scissors-type linkage.

When the jaws 20 are then closed, i.e. in the case of a circular cylindrical outer housing 10 where the jaws 20 are closed radially inwards, the outer housing 10 is plastically deformed. Due to the plastic deformation, the outer housing 10 will tend to become longer. In so doing, it will, however, strike against the stops 24, and the material will move into the recesses 22 to form the surrounding projections 18.

Alternatively or additionally to the projections 18, the outer housing 10 could, of course, also have a surrounding indentation. But this would then require the provision of projections 40 on the jaws 20, which complement one another circumferentially. FIG. 2 shows such a projection 40 on a jaw 20, for example, and further shows an indentation 30 in the outer housing 10, which is illustrated by broken lines in FIG. 2 in the plastically deformed condition.

The deformation and the continuously surrounding projections 18 provide the outer housing 10 with a distinctly better stability. In addition, the axial tolerances during shrinking are practically reduced to zero, because all outer housings may have the same axial length; with an appropriate adjustment of the stops 24, the outer housings will always rest against them after deformation.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of manufacturing an exhaust gas carrying device, in particular an exhaust gas purification device, which has an outer housing with an insert clamped therein, and wherein the insert comprises a substrate and a flexible bearing mat surrounding the substrate, the method comprising the following steps:
    a) providing a tool having a plurality of jaws which are adapted to be moved inwards against the outer housing, and wherein the jaws extend axially beyond a length of the outer housing;
    b) providing an indentation on an inside of each jaw, with indentations of all jaws being oriented in relation to each other such that a continuously surrounding indentation is obtained;
    c) placing the outer housing and the insert positioned therein into the tool;
    d) deforming the outer housing by closing the jaws to clamp the insert in the outer housing; and
    e) producing a continuously surrounding projection on the outer housing remote from ends of the outer housing when closing the jaws and deforming the outer housing and the flexible bearing mat such that the mat extends into the surrounding projection.

2. The method according to claim 1, wherein producing the continuously surrounding projection in step (e) includes producing a plurality of continuously surrounding projections that are axially spaced from each other along a length of the outer housing such that opposing axial ends of the insert extend axially beyond the projections.

3. The method according to claim 2, wherein the plurality of continuously surrounding projections are formed in the outer housing between opposing axial ends of the substrate and the flexible bearing mat.

4. The method according to claim 1, wherein producing the continuously surrounding projection in step (e) includes producing a plurality of continuously surrounding projections that are axially spaced from each other on the outer housing.

5. The method according to claim 1, including forming the continuously surrounding projection to have an arcuate radial end in cross-section.

6. The method according to claim 1, including configuring the outer housing as a circumferentially closed tube into which the insert is inserted.

7. The method according to claim 1, including forming the indentations on the jaws such that each jaw includes more than one indentation.

8. The method according to claim 1, wherein the outer housing surrounds an axis and extends from an inlet end to an outlet end along the axis, and wherein producing the continuously surrounding projection in step (e) includes producing a continuously surrounding projection to extend continuously in a circumferential direction about the axis and to be axially spaced apart from each other along the length of the housing spanning from the inlet end to the outlet end.

9. A method of manufacturing an exhaust gas carrying device, in particular an exhaust gas purification device, which has an outer housing with an insert clamped therein, and wherein the insert comprises a substrate and a flexible bearing mat surrounding the substrate, the method comprising the following steps:
   a) providing a tool having a plurality of jaws that are circumferentially spaced apart from each other and which are adapted to be moved radially inwards against the outer housing;
   b) providing a plurality of indentations on an inside of each jaw, with indentations of circumferentially adjacent jaws being oriented in relation to each other such that a continuously surrounding indentation is obtained, and with the indentations of each jaw being axially spaced apart from each other;
   c) placing the outer housing and the insert positioned therein into the tool;
   d) deforming the outer housing by closing the jaws to clamp the insert in the outer housing; and
   e) producing a plurality of continuously surrounding projections on the outer housing remote from ends of the outer housing when closing the jaws, the plurality of continuously surrounding projections being axially spaced apart from each other along a length of the outer housing, and deforming the outer housing and the flexible bearing mat such that the mat extends into the projections.

10. The method according to claim 9, wherein opposing axial ends of the insert extend axially beyond respective opposing axial ends of the plurality of continuously surrounding projections.

11. The method according to claim 10, wherein the plurality of continuously surrounding projections are formed in the outer housing between opposing axial ends of the substrate and the flexible bearing mat.

12. The method according to claim 9, wherein each of the plurality of the jaws has a greater length than the length of the outer housing.

13. The method according to claim 9, including configuring the outer housing as a circumferentially closed tubular housing into which the insert is inserted.

14. The method according to claim 9, wherein the outer housing surrounds an axis and extends from an inlet end to an outlet end along the axis, and wherein producing the plurality of continuously surrounding projections in step (e) includes producing a plurality of continuously surrounding projections to extend continuously in a circumferential direction about the axis and to be axially spaced apart from each other along the length of the housing spanning from the inlet end to the outlet end.

15. A tool for manufacturing an exhaust gas carrying device comprising:
   a plurality of movable jaws having inner faces of which, in a closed condition, have an inner contour corresponding to an outer contour to be attained of an outer housing, the plurality of jaws having on each of the inner faces thereof a plurality of indentations circumferentially adjoining the plurality of the indentations of adjacent jaws to produce a plurality of continuously surrounding annular projections that are axially spaced apart from each other along a length of the outer housing; and
   wherein circumferentially adjoining indentations of adjacent jaws form a plurality of continuously surrounding annular indentations, and with the continuously surrounding annular indentations being axially spaced apart from each other along an axial length of each of the plurality of movable jaws.

16. The tool according to claim 15, wherein the axial length of the plurality of movable jaws is greater than the length of the outer housing.

17. The tool according to claim 15, wherein each of the plurality of movable jaws is defined by a jaw length extending axially from a first jaw end to a second jaw end, and wherein each jaw length is greater than the length of the outer housing.

18. The tool according to claim 15, wherein each of the plurality of indentations has an arcuate radial end in cross-section.

19. The tool according to claim 15, wherein the outer housing surrounds an axis and extends from an inlet end to an outlet end along the axis, and wherein the plurality of continuously surrounding annular projections are configured to extend continuously in a circumferential direction about the axis and to be axially spaced apart from each other along the length of the housing spanning from the inlet end to the outlet end.

* * * * *